United States Patent
Kronander et al.

(10) Patent No.: US 10,098,040 B2
(45) Date of Patent: Oct. 9, 2018

(54) USE OF SHARED RESOURCES INDICATED BY TEMPLATE FRAME

(71) Applicant: Telefonaktiebolaget LM Ericsson (publ), Stockholm (SE)

(72) Inventors: Jonas Kronander, Knivsta (SE); Robert Baldemair, Solna (SE); Zhan Zhang, Beijing (CN)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 84 days.

(21) Appl. No.: 15/112,550

(22) PCT Filed: Jan. 21, 2014

(86) PCT No.: PCT/EP2014/051131
§ 371 (c)(1),
(2) Date: Jul. 19, 2016

(87) PCT Pub. No.: WO2015/110147
PCT Pub. Date: Jul. 30, 2015

(65) Prior Publication Data
US 2016/0381604 A1    Dec. 29, 2016

(51) Int. Cl.
*H04W 28/26* (2009.01)
*H04W 16/10* (2009.01)
(Continued)

(52) U.S. Cl.
CPC .......... *H04W 28/26* (2013.01); *H04W 16/10* (2013.01); *H04W 16/14* (2013.01); *H04W 72/0406* (2013.01)

(58) Field of Classification Search
CPC ..... H04W 16/10; H04W 16/14; H04W 28/26; H04W 72/0406
See application file for complete search history.

(56) References Cited

U.S. PATENT DOCUMENTS

| 2003/0058826 A1 | 3/2003 | Shearer, III |
| 2008/0159208 A1* | 7/2008 | Kloker ........ H04W 16/14 370/329 |

(Continued)

FOREIGN PATENT DOCUMENTS

WO    2015110145 A1    7/2015

OTHER PUBLICATIONS

IEEE Standards Association, "IEEE Standard for Information Technology—Telecommunications and Information exchange between systems—Local and metropolitan area networks—Specific requirements; Part 11: Wireless LAN Medium Access Control (MAC) and Physical Layer (PHY) specifications; Amendment 10: Mesh Networking", Sep. 10, 2011, pp. 1-372, IEEE Computer Society.

(Continued)

*Primary Examiner* — Benjamin H Elliott, IV
(74) *Attorney, Agent, or Firm* — Coats & Bennett, PLLC

(57) ABSTRACT

The present disclosure generally relates to the field of resource reservation. More specifically, the present disclosure relates to a technique of reserving shared communication resources in a wireless communication network. The wireless communication network comprises a plurality of access nodes, each of the plurality of access nodes being connected to one or more of the plurality of access nodes via one or more links A method embodiment comprises the steps of: receiving, by an access node (100) of the plurality of access nodes, allocation information indicating one or more shared communication resources of available communication resources, the one or more shared communication resources are to be shared by a link of the access node (100) with one or more other links of the wireless communication network; and transmitting, by the access node (100), first reservation information to one or more other access nodes (100a) of the plurality of access nodes, the first reservation (Continued)

information comprising information indicating that at least one shared communication resource of the one or more shared communication resources is reserved, for at least one link of at least one of the plurality of access nodes, for usage by the at least one of the plurality of access nodes.

15 Claims, 9 Drawing Sheets

(51) Int. Cl.
*H04W 16/14* (2009.01)
*H04W 72/04* (2009.01)

(56) References Cited

U.S. PATENT DOCUMENTS

| | | | | |
|---|---|---|---|---|
| 2011/0075603 | A1* | 3/2011 | Muqattash | H04W 16/14 370/328 |
| 2013/0121337 | A1 | 5/2013 | Nguyen et al. | |
| 2015/0163147 | A1 | 6/2015 | Li et al. | |
| 2016/0150526 | A1* | 5/2016 | Koudouridis | H04W 72/0413 370/329 |
| 2016/0381604 | A1* | 12/2016 | Kronander | H04W 16/10 370/329 |

OTHER PUBLICATIONS

Akyildiz, I., et al., "CRAHNs: Cognitive radio ad hoc networks", Journal Article, Ad Hoc Networks 7, Jan. 14, 2009, pp. 810-836, Elsevier.

Hui, D., et al., "Joint Routing and Resource Allocation for Wireless Self-Backhaul in an Indoor Ultra-Dense Network", 2013 IEEE 24th International Symposium on Personal, Indoor and Mobile Radio Communications: Mobile and Wireless Networks, Sep. 8, 2013, pp. 3083-3088, IEEE.

Aydin, O. et al., "Deliverable D4.1 Summary on preliminary trade-off investigations and first set potential network—level solutions", Document No. ICT-317669-METIS/D4.1, Project name: Mobile and wireless communications Enablers for the Twenty-twenty Information Society (METIS), Sep. 30, 2013, pp. 1-97.

Lee. Y. L.,et al., "MCCA—Assisted Multi-Radio System using Directional Antenna", 2012 5th International Symposium on Communications Control and Signal Processing (ISCCSP), May 2, 2012, pp. 1-6, Rome, Italy.

IEEE Standards Association, "IEEE Standard for Information Technology—Telecommunications and Information exchange between systems—Local and metropolitan area networks—Specific requirements; Part 11: Wireless LAN Medium Access Control (MAC) and Physical Layer (PHY) specifications", Feb. 6, 2012, pp. 1-2793, IEEE Computer Society.

Yu, X. et al., "Distributed resource reservation for real time sessions in multi-hop wireless networks", 2011 7th International Wireless Communications and Mobile Computing Conference, Jul. 4, 2011, pp. 255-260, IEEE.

Yu, X, et al., "Resource Reservation Schemes for IEEE 802.11 Based Wireless Networks A Survey", IEEE Communications Surveys & Tutorials, Nov. 29, 2012, pp. 1042-1061, vol. 15, Issue 3, IEEE.

Bernardos, C., et al., "Challenges of designing jointly the backhaul and radio access network in a cloudbased mobile network", Future Network and Mobile Summit Conference Proceedings, Jul. 3, 2013, pp. 1-10, IEEE.

\* cited by examiner

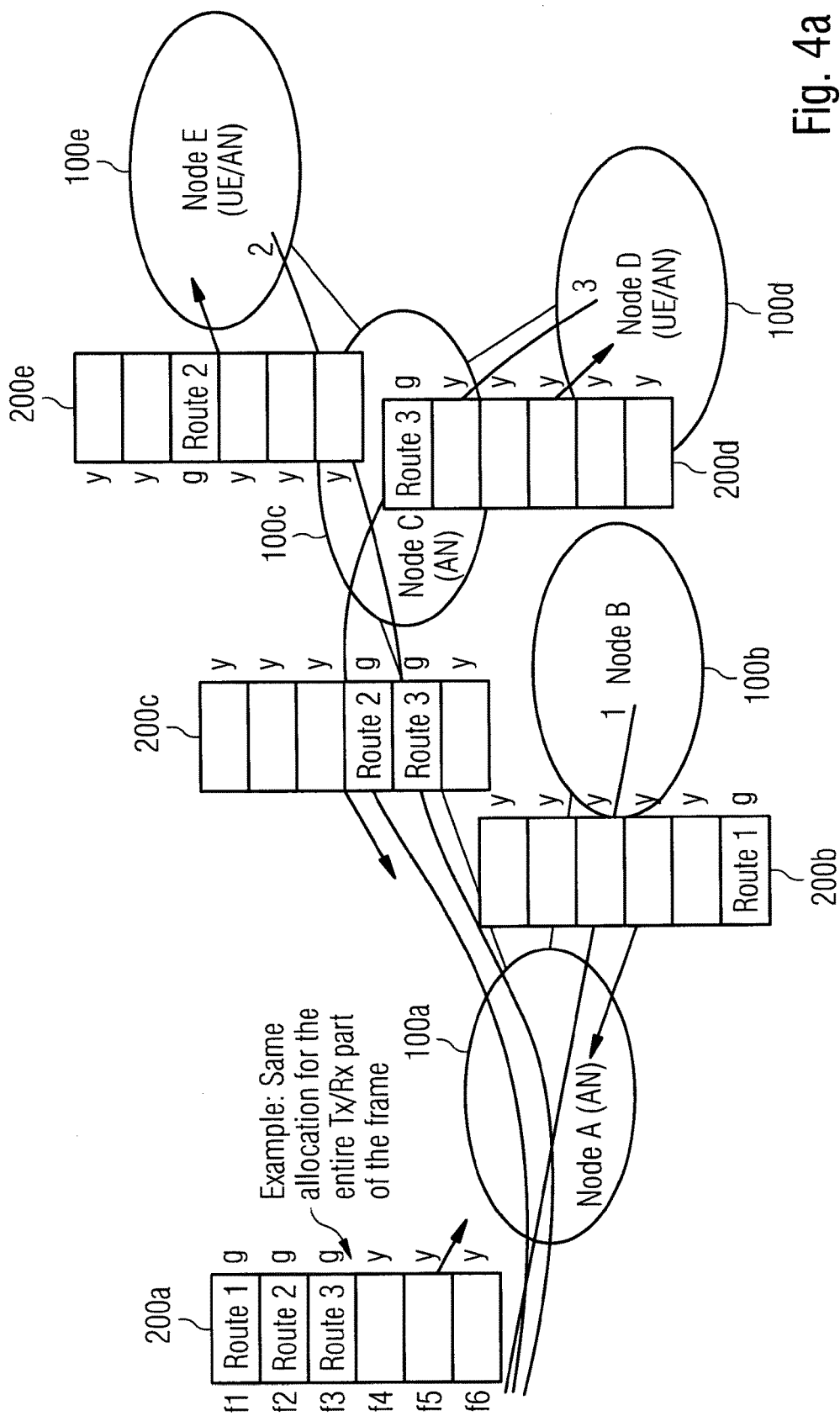

USE OF SHARED RESOURCES INDICATED BY TEMPLATE FRAME

TECHNICAL FIELD

The present disclosure generally relates to the field of resource reservation. More specifically, the present disclosure relates to a technique of reserving shared communication resources in a wireless communication network.

BACKGROUND

In mobile communications, there is an increasing demand for higher system capacity and end-user data rates. For this purpose, communication systems are densified more and more by providing a higher number of access nodes with smaller distances (from one access node to another access node) as compared with common communication systems. Still further, demands for very high system capacity and very high end-user date rates can be met by so-called Ultra-Dense Networks (UDNs). UDNs may be regarded as networks with access-node densities considerably higher than the densest cellular networks of today. Such UDNs may be set up with distances between access nodes from a few meters in indoor deployments up to around 50 m in outdoor deployment.

Data rates of the order of 10 Gigabits per second (Gbps) can be practically achieved only with a sufficiently large transmission bandwidth, significantly larger than the current maximum of 100 MHz for the Long Term Evolution (LTE) standard. UDNs may be expected to use a maximum transmission bandwidth of up to around 1 to 2 GHz. Such very wide transmission bandwidths are realistically only possible at higher frequency bands beyond 10 GHz. For example, frequencies in the lower part of the millimeter wave band up to 100 GHz may be of specific interest for UDNs.

In situations where directive beamforming is used in a UDN, informing other access nodes of upcoming use of communication resources, or spreading information on resource reservations, in a distributed fashion, is non-trivial. In the UDN context wireless self-backhaul for a set of UDN nodes and interference aware routing solutions for routing packets through the backhaul networks have been proposed by D. Hui and J. Axnäs in the paper "Joint Routing and Resource Allocation for Wireless Self-Backhaul in an Indoor Ultra-Dense Network", PIMRC 2013. With self-backhauling, an access node serves not only its own assigned UEs in the vicinity but also its neighbouring access nodes as a relaying node in order to route data towards and/or from an information aggregation node. To maximize the throughput of each route, a route selection process takes into account the mutual interference among wireless links. According the concept of the aforementioned paper, one approach is to jointly optimize route selection and radio resource allocation. For this purpose, the original network may be transformed to an expanded virtual network in which each virtual node represents a possible way of allocating radio resources to the access node. A route selected in such a virtual network jointly determines a sequence of access nodes (i.e. the real route) and the corresponding radio resources allocated to the links associated with these nodes. This and similar concepts provide a solution focusing on interference aware routing under full buffer assumptions.

The Wi-Fi family IEEE 802.11 uses most commonly a distributed coordination function (DCF) based on users contending for the resources. Each user backs off a random time interval before accessing the channels. This procedure ensures long term fairness in the access of the communication resources, but inherently relies on overhearing other nodes transmissions and hence omni-directional transmissions. Procedures that work fine for omni-directional transmissions, e.g. Carrier Sense Multiple Access with Collision Avoidance (CSMA/CA) procedures, may be inefficient and/or not work in an UDN environment due to transmit and receive beamforming.

The mesh coordination function controlled channel access (MCCA) in IEEE 802.11s specifies that the stations/nodes with this functionality enabled may make reservations of the wireless medium. The reservations are typically for omnidirectional transmissions, but not necessarily so. The procedure is as follows:

1) A first station transmits a MCCA Setup Request. This station becomes a mesh coordination function controlled channel access opportunity (MCCAOP) owner. The transmission is omni-directional and the destination address of the message may be a single station or group destination address. The MCCA Setup Request specifies channel reservations for the entire channel with a specified start time, duration, and periodicity of the transmission. Each channel reservation has a reservation ID number, to uniquely identify the reservation.

2) The receivers of the reservation, the MCCAOP responders, return a MCCA Setup Reply to accept or reject the reservation. If the reservation is rejected the reply may contain a suggestion of a different reservation for the first station to use.

The 802.11s standard is designed to be operating in an environment where mobile stations transmit using omnidirective transmissions. For this reason the standard does not include the intended receiver of the transmission that will take place during the MCCA Setup Request, i.e., the resource reservation, or any other reservation message. Hence the standard does not provide for easy spatial reuse of the transmission resources in environments where directive transmissions are employed and/or required.

The MCCA relies on omni-directional transmissions. Directional transmissions increase the hidden node probability and hence the receivers of the MCCA Setup Requests have a larger probability to be hidden nodes (from the perspective of the MCCAOP owner), i.e., they do not overhear the MCCA Setup Request because it is sent in another direction. Hence in these environments there is a high probability that the MCCA procedure will generate conflicting reservations (when the hidden nodes try to reserve the same resources as sending the initial MCCA Setup Request that these nodes did not receive). Such conflicting reservations would cause degraded network performance (throughput) by increased interference and a high number of colliding transmissions.

In addition, the MCCA function allocates the entire channel for a time duration, which is suboptimal when considering very wide channels, e.g., of the order 1-2 GHz which is expected to be used by UDNs. Furthermore, in the MCCA function there is no support for traffic classes with different priorities.

SUMMARY

Accordingly, there is a need for an improved technique for resource reservation.

According to a first aspect, a method of reserving shared communication resources in a wireless communication network is provided. The wireless communication network comprises a plurality of access nodes. Each of the plurality of access nodes is connected to one or more of the plurality of access nodes via one or more links. The method comprises the step of receiving, by an access node of the plurality of access nodes, allocation information indicating one or more shared communication resources of available communication resources. The shared communication resources are to be shared by a link of the access node with one or more other links of the wireless communication network. The method comprises transmitting, by the access node, first reservation information to one or more other access nodes of the plurality of access nodes. The first reservation information comprises information indicating that at least one shared communication resource of the one or more shared communication resources is reserved, for at least one link of at least one of the plurality of access nodes, for usage by the at least one of the plurality of access nodes.

The at least one of the plurality of access nodes using the reserved at least one shared communication resource of the one or more shared communication resources may correspond to or comprise the access node transmitting the first reservation information to one or more other access nodes of the plurality of access nodes. Alternatively, the at least one of the plurality of access nodes using the reserved at least one shared communication resource of the one or more shared communication resources may be different from the access node transmitting the first reservation information to one or more other access nodes of the plurality of access nodes. For example, the access node transmitting the first reservation information to one or more other access nodes of the plurality of access nodes may be the receiver of the transmission using the reserved at least one shared communication resource.

In accordance with the method of the first aspect, the access node may receive allocation information for each of its one or more links, i.e., for each of the one or more links of the access node. In other words, the number of allocation information received by the access node may be adapted to the number of links of the access node, i.e., the number of allocation information received by the access node may correspond to the number of links of the access node. The allocation information for each of the one or more links may be specifically configured for the respective one of the one or more links. The allocation information for the one or more links of the access node may differ from each other. Each of the plurality of access nodes may receive such allocation information for each of its one or more links, respectively.

Even if hereinbelow it is only referred to allocation information in general or allocation information of the access node, this may be understood to mean allocation information for a link of the one or more links.

The one or more links may be referred to as wireless links, respectively. The wireless communication network may comprise or may be configured as an Ultra Dense Network (UDN). An UDN may be regarded as a network with access-node densities considerably higher than the densest cellular networks of today. Such UDNs may be set up with distances between access nodes from a few meters in indoor deployments up to around 50 m in outdoor deployment.

An access node may be configured or comprise a base station such as an eNodeB in terms of LTE, a mobile terminal such as a User Equipment (UE), a wireless access point (WAP), a station (STA) in the sense of the 802.11 standard family or the like. The plurality of access nodes may comprise one or more aggregation nodes. An aggregation node may be regarded as a node forming the connection to or entry point of the core network of the wireless communication network. An aggregation node may be regarded as a standard access node (set up to serve end users) with a wired backhaul connection. For example, the aggregation node may be an eNodeB or similar base station.

Each of the plurality of access nodes may be connected to one or more of the plurality of access nodes via one or more links to provide a plurality of routes for routing data through the wireless communication network. A route may be regarded as a path in the communication network from a source access node (e.g., an aggregation point of a backhaul network such as an aggregation node) to a destination access node. Each route may be formed by one or more links connecting the source access node and the destination access node via one or more intermediate access nodes.

The allocation information may further indicate, for the one or more links of the access node, at least one of which of the available communication resources is to be allocated to one or more of a plurality of routes, which of the available communication resources is to be not allocated to one or more of the plurality of routes, and which of the available communication resources is prohibited from being allocated to one or more of the plurality of routes.

The step of receiving the allocation information may comprise, for the one or more links of the access node, receiving at least one template frame, the at least one template frame indicating how the available communication resources are to be allocated. For each of the one or more links of the access node, one or more template frames may be received. The template frame may have the same general structure for each link, but the information contained in the template frame may at least partially be different for each link. The at least one template frame may comprise a transmission portion (or transmission part) indicating how the available communication resources are to be allocated for data transmission and a reception portion (or reception part) indicating how the available communication resources are to be allocated for data reception. The at least one template frame may comprise two or more sub-frames and two or more sub-bands. The two or more sub-frames (in time domain) and the two or more sub-bands (in frequency domain) may form the available communication resources. The sub-frames may comprise one or more, for example, two time slots. The sub-bands may also be referred to as frequency slots.

The first reservation information may further comprise at least one of: information indicating the at least one shared communication resource that is reserved for usage by the at least one of the plurality of access nodes; information indicating the starting time of the at least one shared communication resource that is reserved for usage by the at least one of the plurality of access nodes; information indicating the end time of the at least one shared communication resource that is reserved for usage by the at least one of the plurality of access nodes; information indicating the duration of the at least one shared communication resource that is reserved for usage by the at least one of the plurality of access nodes; information indicating the priority of the reservation of the at least one shared communication resource that is reserved for usage by the at least one of the plurality of access nodes; information indicating at least one of the plurality of access nodes which is intended to be the receiver of transmissions using the at least one shared communication resource that is reserved for usage by the at least one of the plurality of access nodes; and information indicating at least one of the plurality of access nodes which is intended to be the transmitter of transmissions using the at least one shared communication resource that is reserved for usage by the at least one of the plurality of access nodes.

The method may further comprise the step of using, by the at least one of the plurality of access nodes, the at least one shared communication resource as indicated by the first reservation information a time period after the transmission of the first reservation information. The step of transmitting the reservation information may comprise transmitting the reservation information by flooding to at least a subset of the plurality of access nodes. In this respect, the term "flood information to access nodes" may denote that the information may be distributed to the access nodes optionally via further or intermediate access nodes which may forward or relay the received information further.

The time period may be determined by considering the number of links from the at least one access node to another access node which is furthest away from the at least once access node in the wireless communication system. In other words, for each access node in the wireless communication system, an individual time period may be determined. In this way, the time period may be determined such that it is ensured that all of the plurality of access nodes have received the first reservation information. Thus, it is ensured that all of the plurality of access nodes have been informed about the usage of the at least one shared communication resource before the at least one shared communication resource is used by the at least one of the plurality of access nodes. For example, the starting time of using the reservation (the at least one shared communication resource) as indicated in the first reservation information may not be before the time for flooding in the communication network, i.e., the number of frames until the first reservation information has been received by all access nodes in the wireless communication network. This delay (compared to starting to use the shared communication resource(s) immediately) avoids collisions in the shared communication resource(s) (in the sense of colliding uses of the same shared resource(s)).

The method may further comprise the step of receiving, by the access node from another access node of the plurality of access nodes, second reservation information comprising information indicating that at least one shared communication resource of the one or more shared communication resources is reserved for at least one other link of at least one of the plurality of access nodes.

According to a possible realization of the method according to the first aspect, the method may further comprise the step of determining, by the access node, whether the usage of the at least one shared communication resource as indicated by the second reservation information is compatible with the usage of the at least one shared communication resource as indicated by the first reservation information.

The step of determining whether the usage of the at least one shared communication resource as indicated by the second reservation information is compatible with the usage of the at least one shared communication resource as indicated by the first reservation information may comprise determining whether the usage of the at least one shared communication resource as indicated by the second reservation information interferes with the usage of the at least one shared communication resource as indicated by the first reservation information.

Dependent on the result of the aforementioned determination of whether the usage of the at least one shared communication resource as indicated by the second reservation information is compatible with, e.g., interferes with, the usage of the at least one shared communication resource as indicated by the first reservation information, one of several options may be chosen by the access node.

According to a first option, if it is determined that the usage of the at least one shared communication resource as indicated by the second reservation information is compatible with the usage of the at least one shared communication resource as indicated by the first reservation information, the method may comprise the step of forwarding, by the access node, the second reservation information to at least one other of the plurality of access nodes.

According to a second option, if it is determined that the usage of the at least one shared communication resource as indicated by the second reservation information is not compatible with the usage of the at least one shared communication resource as indicated by the first reservation information, the method may comprise the step of not forwarding (or refraining from forwarding), by the access node, the second reservation information to at least one other of the plurality of access nodes. In this way, usage of (an) incompatible shared communication resource(s) by different access nodes is prevented.

According to a third option, if it is determined that the usage of the at least one shared communication resource as indicated by the second reservation information is not compatible with the at least one shared communication resource as indicated by the first reservation information, the method may comprise the step of forwarding, by the access node, the second reservation information to at least one of the plurality of access nodes, if information contained in the first and second reservation information indicates that the priority of the reservation of the at least one shared communication resource as indicated by the second reservation information is higher than the priority of the reservation of the at least one shared communication resource as indicated by the first reservation information. In other words, if the priority would not be considered, the access node may refrain from forwarding the second reservation information because the usage of the at least one shared resource(s) as indicated by the first and second reservation information is incompatible with each other. As, according to the third option, the priority of the respective reservation information is considered, it is ensured that the more important reservation information is forwarded by the access node and the respective reservation (reservation of the at least one shared communication resource) can be used.

The decision which is the more important reservation information may be based on the identity of the receiving access node, i.e., the identity of the receiver of a transmission using the at least one shared communication resource as indicated by the second reservation information and the identity of the receiver using the at least one shared communication resource as indicated by the first reservation information. The foregoing is possible as the access node knows the destination of its own transmission and the access node which has transmitted the second reservation information knows the destination of its own transmission and vice versa. In one possible implementation, the destination node is prioritized which is closer to an aggregation node. In other words, access nodes closer to the aggregation node (i.e., closer to the wired backhaul) may have higher priority than access nodes that are more hops away from the aggregation node. This scheme prioritizes traffic that is sent close to the aggregation node. This may be considered beneficial since capacity bottlenecks are more likely to appear close to the aggregation node than further away (measured in number of hops) from it.

According to a fourth option, if it is determined that the usage of the at least one shared communication resources as indicated by the second reservation information is not compatible with the usage of the at least one shared communication resource as indicated by the first reservation information, the method may comprise the step of forwarding, by the access node, the second reservation information to at least one other of the plurality of access nodes if the second reservation information has been sent out earlier, by another access node, than the first reservation information by the access node.

The above-mentioned concept according to the possible realization of the method according to the first aspect may equally be applied to a receiving access node which is not the transmitter of the first reservation information, but the receiver of the first reservation information. When the receiving access node, after receipt of the first reservation information, receives the second reservation information, the receiving access node may determine whether to forward the first or second reservation information. This determination may be performed by determining, by the receiving access node, whether the usage of the at least one of the shared communication resources as indicated by the second reservation information is compatible with the usage of the at least one shared communication resource as indicated by the first reservation information. Again, this may comprise determining whether the usage of the at least one shared communication resource as indicated by the first reservation information interferes with the usage of the at least one shared communication resources as indicated by the second reservation information.

If it is determined that usage of the at least one shared communication resource as indicated by the second reservation information is compatible with the usage of the at least one shared communication resource as indicated by the first reservation information, the receiving access node may be configured to forward the second resource information but to refrain from reserving the at least one shared communication resource during the indicated time in the reservation.

If it is determined that the usage of the at least one shared communication resource as indicated by the second reservation information is not compatible with the usage of the at least one shared communication resource as indicated by the first reservation information, the one of the first and second reservation information may be forwarded by the receiving access node to at least one other of the plurality of access nodes which contains information indicating that the priority of the reservation of the respective at least one shared communication resource is higher. Alternatively, if it is determined that the usage of the at least one shared communication resource as indicated by the second reservation information is not compatible with the usage of the at least one shared communication resource as indicated by the first reservation information, one of the first and second reservation information may be forwarded, by the receiving access node to at least one other of the plurality of access nodes, which has been sent out earlier.

In other words, dependent on the result of the aforementioned determination of whether the usage of the at least one shared communication resource as indicated by the second reservation information is compatible with, e.g., interferes with, the usage of the at least one shared communication resource as indicated by the first reservation information, one of the four options identified above (with respect to the access node) may equally be chosen by the receiving access node. For sake of brevity, it is thus referred to the four options set out above, which can be similarly performed by the receiving access node.

According to a second aspect, a computer program is provided. The computer program comprises program code portions for performing the steps of any one of the method aspects described herein, when the computer program is run on one or more computing devices. The computer program may be stored on a computer readable recording medium.

According to a third aspect, an access node for reserving shared communication resources in a wireless communication network is provided. The wireless communication network comprises a plurality of access nodes. Each of the plurality of access nodes is connected to one or more of the plurality of access nodes via one or more links. The access node comprises a receiving component and a transmitting component. The receiving component is configured to receive allocation information indicating one or more shared communication resources of available communication resources. The shared communication resources are to be shared by a link of the access node with one or more other links of the wireless communication network. The transmitting component is configured to transmit first reservation information to one or more other access nodes of the plurality of access nodes. The first reservation information comprises information indicating that at least one shared communication resource of the one or more shared communication resources is reserved, for at least one link of at least one of the plurality of access nodes, for usage by the at least one of the plurality of access nodes. The access node according to the third aspect may be adapted to perform any of the method steps described above.

According to a fourth aspect, a communication system for reserving shared communication resources in a wireless communication network is provided. The wireless communication network comprises a plurality of access nodes as described herein. Each of the plurality of access nodes is connected to one or more of the plurality of access nodes via one or more links.

The system may be configured to perform the steps of any one of the method aspects as described herein.

In general, the steps of any one of the method aspects described herein may equally be embodied in one or more suitable components, devices or units, e.g. in suitable components of the access node and/or the communication system.

BRIEF DESCRIPTION OF THE DRAWINGS

In the following, the present disclosure will further be described with reference to exemplary embodiments illustrated in the figures, in which:

FIGS. 4a and 4b schematically illustrates an Ultra-Dense Network (UDN) in which a template frame is used for communication resource allocation;

DETAILED DESCRIPTION

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, although the present disclosure is described with reference to Ultra-Dense Networks (UDNs), the present disclosure may be practiced in any network to which mobile or stationary users may attach. Further, the skilled person will appreciate that the present disclosure may be practiced with network topologies different from the specific tree structure discussed below to illustrate the present disclosure. Also, for example, the present disclosure is applicable to cellular networks such as Global System for Mobile Communications (GSM), Universal Mobile Telecommunications System (UMTS), Long Term Evolution (LTE), LTE-advanced (LTE-a) networks, or to Wireless Local Area Network (WLAN) or similar wireless networks, but also to wireline networks such as, for example, the Intranet of a company with some or many separated subsidiaries or the Internet.

Those skilled in the art will further appreciate that functions explained herein below may be implemented using individual hardware circuitry, using software functioning in conjunction with a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor and a memory coupled to a processor, wherein the memory is encoded with one or more programs to perform the methods disclosed herein when executed by the processor.

Figure 1A:
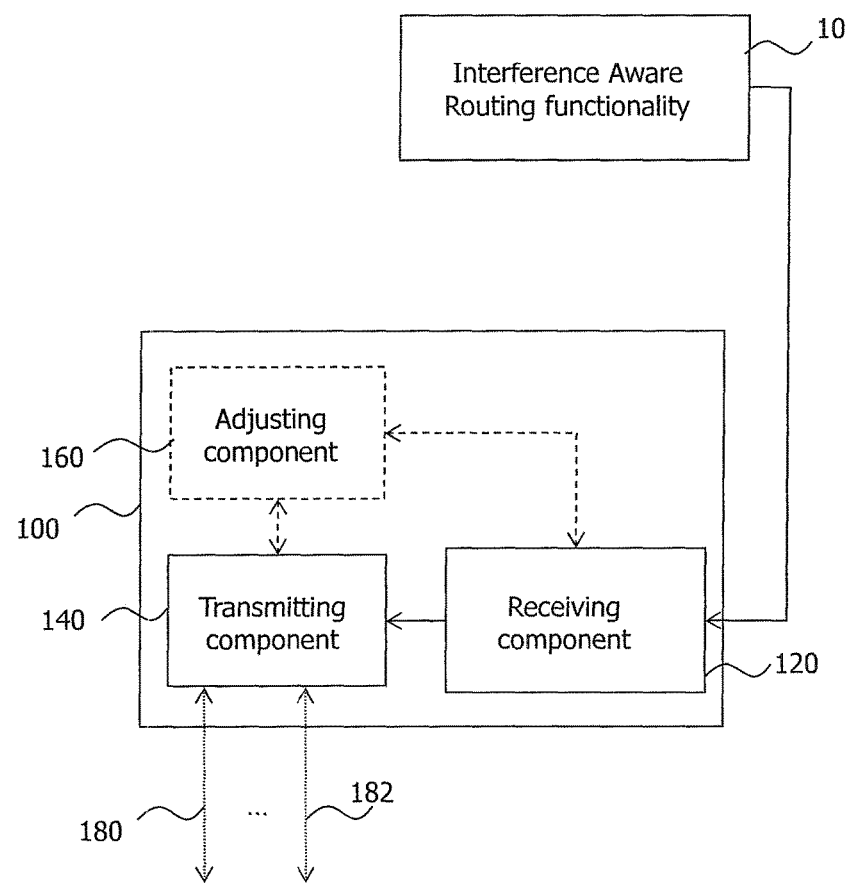
FIG. 1a is a schematic illustration of an access node according to a first device embodiment.

FIG. 1a is a schematic illustration of an access node (AN) 100 according to a first device embodiment. The AN 100 according to the first device embodiment is configured to be connected to an Interference Aware Routing (IAR) functionality 10 or a spectrum sharing functionality (not shown).

The AN 100 comprises a receiving component 120 and a transmitting component 140. The transmitting component 140 may be connected to an adjusting component 160 which is controlled by the Medium Access Control (MAC) layer. Further, by way of example, the AN 100 may comprise one or more data buffers. It is to be noted that the one or more data buffers do not have to be physical memories actually arranged in the AN 100. Alternatively, the one or more data buffers may be logical buffers, which may be arranged anywhere but are associated with the AN 100. Further, two links 180, 182 are schematically illustrated in figure is via which the AN 100 is respectively connected to other ANs of a wireless communication network. For example, the AN 100 is connected to a first AN via the link 180 and to a second AN via the link 182. The two links 180, 182 are meant to illustrate that one or more links may be provided for the AN 100. The AN 100 may further comprise one or more interfaces each of which being coupled to a processor which may access the memory. The receiving component 120 and the transmitting component 140 may be part of the one or more interfaces, the adjusting component 160 may be part of the processor and the one or more data buffers may be part of the memory, as mentioned above. A different distribution of the receiving component 120, the transmitting component 140, the adjusting component 160 and the one or more data buffers over the hardware components of the AN 100 may be also conceivable.

The one or more data buffers may store data which is to be transmitted over the first link 180 and/or over the second link 182 by way of scheduled transmissions. Each of the one or more data buffers relates to one of one or more routes through the wireless communication network. Each of the one or more data buffers is configured for storing the data of the corresponding route. In other words, each of the one or more data buffers is associated with one of the one or more routes.

Figure 1B:
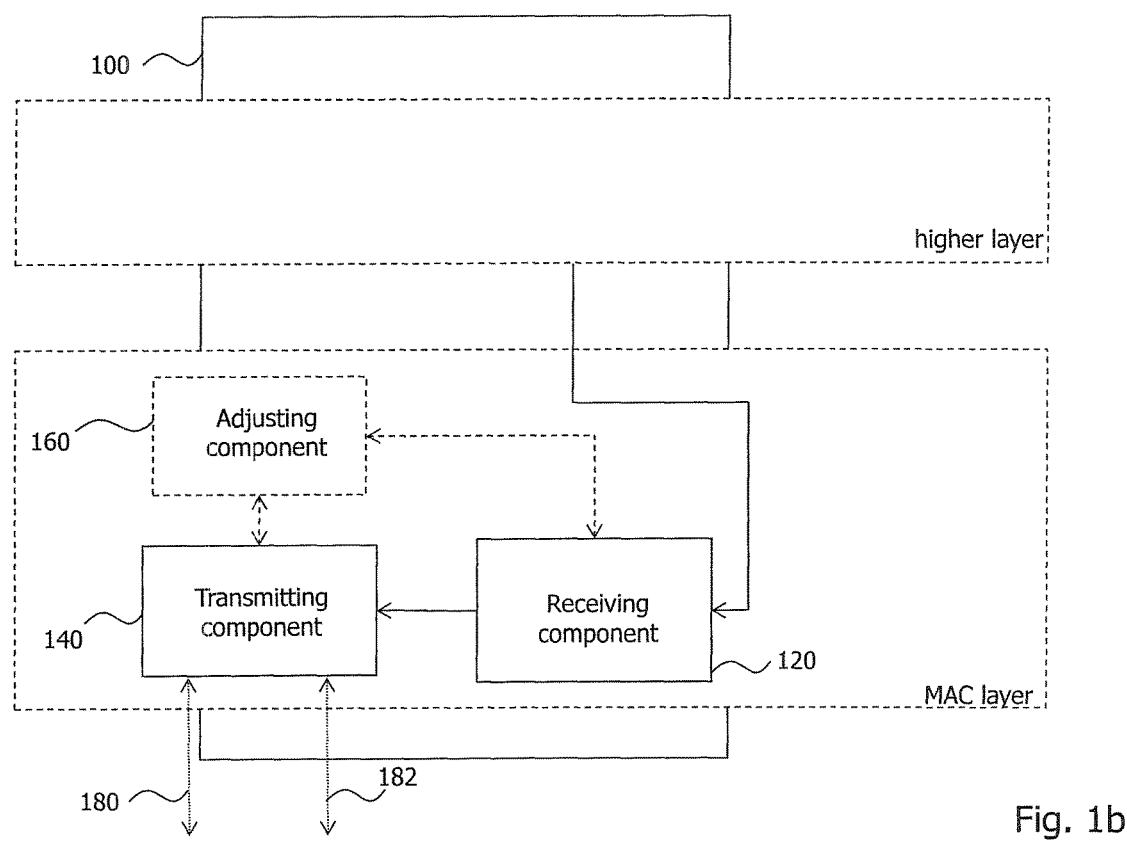
FIG. 1b is a schematic illustration of an access node according to a second device embodiment.

FIG. 1b is a schematic illustration of an AN 100 according to a second device embodiment. All components explained with respect to the AN 100 of the first device embodiment may be equally embodied in the AN 100 of the second device embodiment. Thus, the same reference signs, as used for the first device embodiment, are used for the AN 100 according to the second device embodiment and its components. The only difference between the AN 100 according to the first and second device embodiments is that the AN 100 according to the second device embodiment is not connected to the IAR functionality or spectrum sharing functionality, but the receiving component 120 of the AN 100 is configured to be connected to a higher layer component of the AN 100.

When further details are in the following explained with reference to the AN 100, these details can equally be embodied in the AN 100 according to the first device embodiment and the AN 100 according to the second device embodiment.

Normally, a wireless communication network comprises a plurality of ANs. At least a subset of the plurality of ANs, for example, each of the plurality of ANs, may be configured in the same way as the AN 100 and may comprise a receiving component 120, a transmitting component 140, optionally an adjusting component 160 and optionally one or more data buffers. Each of the plurality of ANs is connected to one or more other access nodes of the plurality of ANs via one or more links to provide a plurality of routes for routing data through the wireless communication network. As mentioned above, with respect to the AN 100, two links 180, 182 are schematically shown to illustrate that the AN 100 and similarly each of the plurality of ANs may be connected to one or more of the plurality of ANs via one or more links.

The functionality of the AN 100 according to the first device embodiment of FIG. 1a and the AN 100 according to the second device embodiment of FIG. 1b will be explained in more detail with respect to FIG. 2 below.

Referring to the AN 100 according to the first and second device embodiments, the receiving component 120 is connected to the IAR functionality 10 or to the spectrum sharing functionality (first device embodiment) or to the higher layer component (second device embodiment). The receiving component 120 is configured to receive, for the links 180, 182 of the AN 100, allocation information (step S202). The allocation information is either received from the IAR functionality 10 or the spectrum sharing functionality (first device embodiment) or from a layer which is higher in the OSI model than the MAC layer (second device embodiment). As the MAC layer is arranged in layer 2 such higher layer may, for example, be layer 3 or layer 4.

The allocation information indicates one or more shared communication resources of available communication resources. The shared communication resources are to be shared by at least one link 180, 182 of the AN 100 with one or more other links of the wireless communication network, e.g., another link of the AN 100 or one or more links of other ANs of the plurality of ANs. The allocation information may generally indicate how available communication resources are to be allocated. This will be explained in more detail below. The allocation information may comprise information indicating at least one of: which of the available communication resources is to be allocated to one or more of routes, which of the available communication resources is to be not allocated to one or more routes, and which of the available communication resources is prohibited from being allocated to one or more routes, as will be explained in more detail below.

To explain further, the IAR functionality makes the assumption that all routes have full data buffers, i.e., all previously mentioned data buffers are full, and solves, using methods known in the art, an optimization problem that, e.g., maximize the sum throughput in the network by assigning communication resources to the routes. This allocation is complemented by information provided by regulatory spectrum restrictions (marking some resources in a template frame, which will be explained later, as prohibited) and or restrictions imposed by a higher layer spectrum sharing functionality.

If there is no IAR functionality in the node a higher layer spectrum sharing functionality may provide a template frame, which will be explained later as one example of allocation information. The spectrum sharing functionality may negotiate, or be a proxy for negotiations, with other Ultra-Dense Networks (UDNs) for agreeing on sharing of communication resources between the UDNs. Such agreements may be reflected in such a template frame provided to the AN 100 in that some of the communication resources to be used by another UDN may be marked as prohibited.

The final allocation information, created, for example, as described above, is communicated to the allocating component 140 (in the MAC layer) in the form of a template frame, for example.

Figure 2:
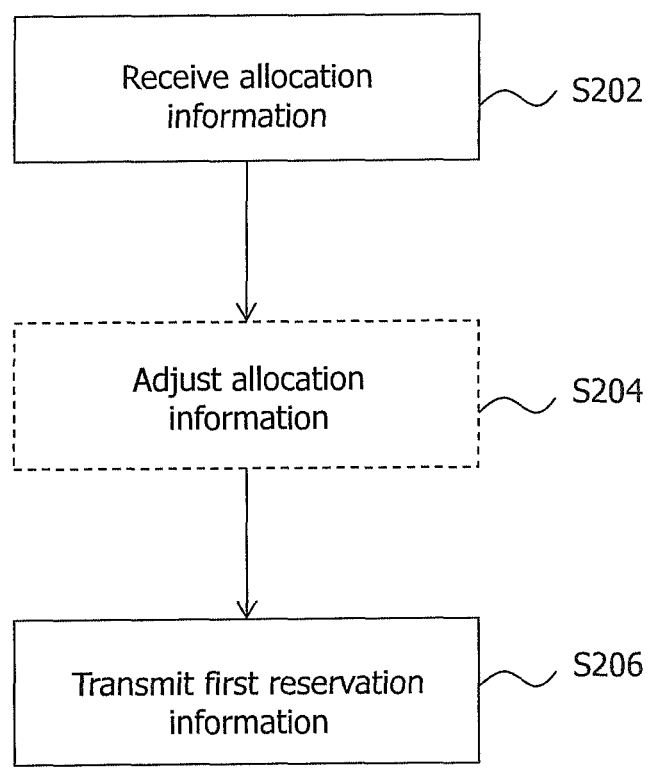
FIG. 2 is a flowchart illustrating a method embodiment performed in the access node of FIG. 1a or 1b.

Referring to FIG. 2, the adjusting component 160 may receive or retrieve the allocation information as received by the receiving component 120 in a step S202. Alternatively, the transmitting component may directly obtain the allocation information as received by the receiving component 120. The adjusting component 160 may be configured to adjust in a step S204, for the links 180, 182 of the AN 100, the received allocation information by considering the status of the one or more data buffers of the AN 100 for buffering data related to the one or more routes (see optional step S204). The transmitting component 140 may then allocate in a step S206, for the links 180, 182 of the AN 100, the available communication resources based on the allocation information or based on the adjusted allocation information.

In the following, it is considered irrelevant whether the step S204 is performed or not. It is just important to note that, for one or more links of the plurality of ANs, one or more of the available communication resources may be shared communication resources. For example, the one or more shared communication resources are to be shared by link 180 of the AN 100 with one or more other links of the wireless communication network as indicated by the allocation information or by adjusted allocation information.

In the step S206, the AN 100 transmits first reservation information to one or more other ANs of the plurality of ANs. The first reservation information comprises information indicating that at least one shared communication resource of the one or more shared communication resources is reserved, for at least one link of at least one of the plurality of ANs, for usage by the at least one of the plurality of ANs. The at least one of the plurality of ANs using the reserved at least one shared communication resource of the one or more shared communication resources may correspond to or comprise the AN 100 transmitting the first reservation information to one or more other ANs of the plurality of ANs. Alternatively, the at least one of the plurality of ANs using the reserved at least one shared communication resource of the one or more shared communication resources may be different from the AN 100 transmitting the first reservation information to one or more other ANs of the plurality of ANs. For example, the AN 100 transmitting the first reservation information to one or more other access nodes of the plurality of access nodes may be the receiver of the transmission using the reserved at least one shared communication resource.

If, for example, the status of a data buffer for buffering data related to a first route indicates that it contains data related to the first route (the route which is associated with a first data buffer) and assuming that link 180 is a hop (the whole, a part, a section or a portion) of the first route, the available communication resources are allocated, for the link 180 of the AN 100, to the first route 1 as indicated by the allocation information. The allocation information may indicate that one or more of the available communication are shared communication resources. If, however, the status of a second data buffer for buffering data related to a second route indicates that there is no data related to the second route (the route which is associated with the second data buffer) and assuming that link 182 is a hop (the whole, a part, a section or a portion) of the second route, the adjusting component 140 does not simply follow the indication of the allocation information. Rather, the adjusting component 140 adjusts the allocation information and allocates the available communication resources to the second route for link 182 (assuming that link 182 is a hop of the second route from a source AN to a destination AN in the network) as indicated by the adjusted allocation information. In such a context, the MAC protocol may address for resource allocation where the routes are allocated but some, or all, do not have traffic all the time. The allocation information may have been adjusted by the adjusting component 160 such that the adjusted allocation information indicates that one or more of the available communication are shared communication resources.

Figure 3:
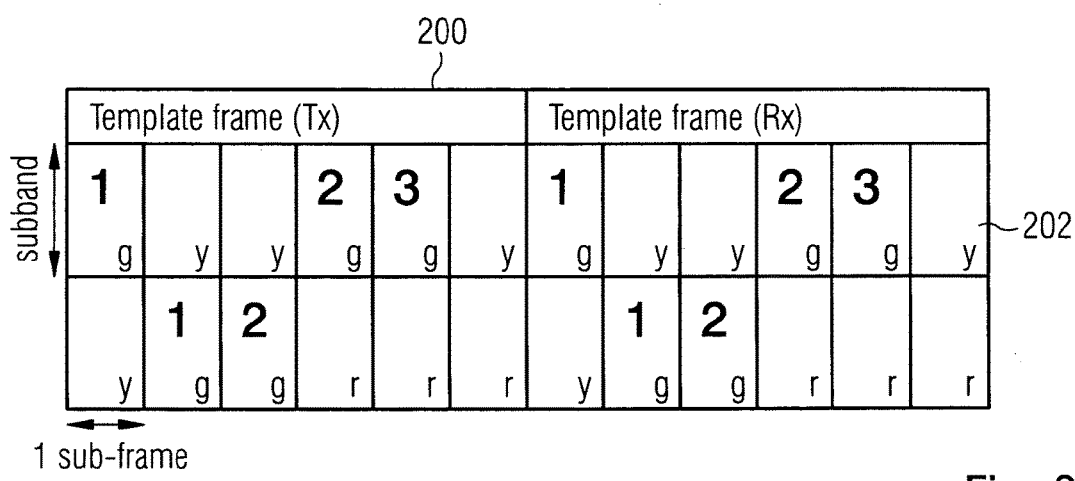
FIG. 3 schematically illustrates a template frame which can be used in the device embodiments of FIGS. 1a and 1b and the method embodiment of FIG. 2.

FIG. 3 schematically illustrates a template frame 200 as one example of how the available communication resources can be arranged and used in the device embodiments of FIGS. 1*a* and 1*b* and the method embodiment of FIG. 2. The input from the IAR or higher layer to the MAC is assumed to be one "template frame" per link. For example, if an AN has three links, e.g., one up-stream (towards an aggregation node (AgN)—a node with wired backhaul connection) and two down-stream (in the direction of the leaf nodes—nodes further away from the fixed backhaul) in a tree structured UDN, the AN will receive three template frames, one for each link, from the IAR.

In the following, the coloring and the content of a template frame 200 will be discussed in more detail.

The template frame 200 of FIG. 3 exemplarily comprises two sub-bands to illustrate a plurality of sub-bands and twelve sub-frames to illustrate a plurality of sub-frames. The two sub-bands and the twelve sub-frames thus form twenty-four communication resources 202 which are available for allocation for each link (i.e., twenty-four available communication resources for each link). The number of sub-bands and sub-frames is merely exemplary for sake of explanation rather than limitation. Thus, the template frame 200 may have any other number of sub-frames and sub-bands. Just to give one example, the template frame may be 100 μs and may comprise 8 sub-frames in total.

The template frame 200 exemplarily comprises a transmission portion indicating how the available communication resources are to be allocated for data transmission and a reception portion indicating how the available communication resources 202 are to be allocated for data reception. The data transmission portion is abbreviated as Tx portion (or Tx part) and is formed, by way of example, by the six most left sub-frames together with the two sub-bands. The data reception portion is abbreviated as Rx portion (or Rx part) and is formed, by way of example, by the six most right sub-frames together with the two sub-bands. Although by way of example the size of the data transmission portion corresponds to the size of the data reception portion, the template frame 200 is not restricted thereto, but the size of the data transmission portion may be different from the size of the data reception portion. In other words, even though the Rx and Tx part of the template frame 200 in FIG. 3 are of equal length, they may also be different in length.

In other words, one template frame contains information for both transmission (Tx) and reception (Rx) for the AN and a respective link. At the other end of the link the Tx and Rx allocations are interchanged. This is since, when the AN at one end of the link transmits, the AN at the other end of the link needs to receive, and the other way around.

In the template frame 200 of FIG. 3, an exemplary allocation of communication resources 202 is indicated. The communication resources 202 marked with a "g" are a first kind of resources, the communication resources 202 marked with a "y" are a second kind of resources and the communication resources 202 marked with an "r" are a third kind of resources. The first, second and third kinds of resources are called in the following green resources, yellow resources and red resources, respectively, in order to visualize an usage functionality thereof. The green resources are the available communication resources 202 which are to be allocated to one or more of the plurality of routes. The yellow resources are the available communication resources 202 which are to be shared with other links. The red resources are the available communication resources 202 which are prohibited from being allocated to one or more of the plurality of routes. In short, in the template frame 200 of FIG. 3, the numbers refer to routes, "g" represents a resource that if used ensures (sufficiently) interference free allocation, "y" represents shared resources, and "r" represents resources that are not to be used. In some situations there are non-allocated resources as well, which are not prohibited. The yellow resources in the template frame 200 are shared (communication) resources that may be used for reducing the risk of buffer overflow and increase the throughput locally. The reason for using yellow resources may be that the link is in a fading dip and may not support the offered traffic using the green resources alone.

To explain further, the red resources as prohibited resources may be regarded as communication resources that may not be used by the MAC layer for communication over a particular link. There exist two types of prohibited resources: one that may never be accessed, a red resource of the first type, and one that may be accessed under certain circumstances (note that the resource turns yellow in these cases), a red resource of the second type—the second type is the non-allocated resource. The reason for the existence of the first type of prohibited resources (the "r" resources) is that they may be the result of spectrum sharing negotiations or coordination between different networks or systems. They may also create unacceptable interference to another link which is allowed to use these resources unconditionally (i.e. a green resource for the other link). A red resource of the second type, i.e., a non-allocated resource, may not be accessed unless the resource is assigned as green to a link from the node that is not having any data. The MAC of the node may choose to use the green resource in a different direction, i.e., for a different link, if the corresponding resource in the new direction is a non-allocated resource (red of the second type). The resource is no longer green in the new transmit direction, i.e., it is not guaranteed by the TAR to not cause any excessive interference to other routes. Rather, the resource turns yellow, a shared resource. This is exemplified in FIG. 5 and will be explained in more detail below.

Referring to FIG. 3, the green resources are respectively allocated or assigned, by way of example, to three different routes, namely route 1, route 2 and route 3. As can be seen by way of example, two green resources are respectively allocated to route 1 in the Tx portion and route 1 in the Rx portion. Likewise, two green resources are respectively allocated to route 2 in the Tx portion and route 2 in the Rx portion. Regarding route 3, one green resource is respectively allocated to route 3 in the Tx portion and route 3 in the Rx portion. Further, there are four yellow resources (shared resources) in the Tx portion and the Rx portion, respectively. How to reserve usage of the shared communication resources will be explained below with respect to FIGS. 6 and 7. Finally, there are three red resources of the first type in the Tx portion and the Rx portion, respectively.

Figure 4B:
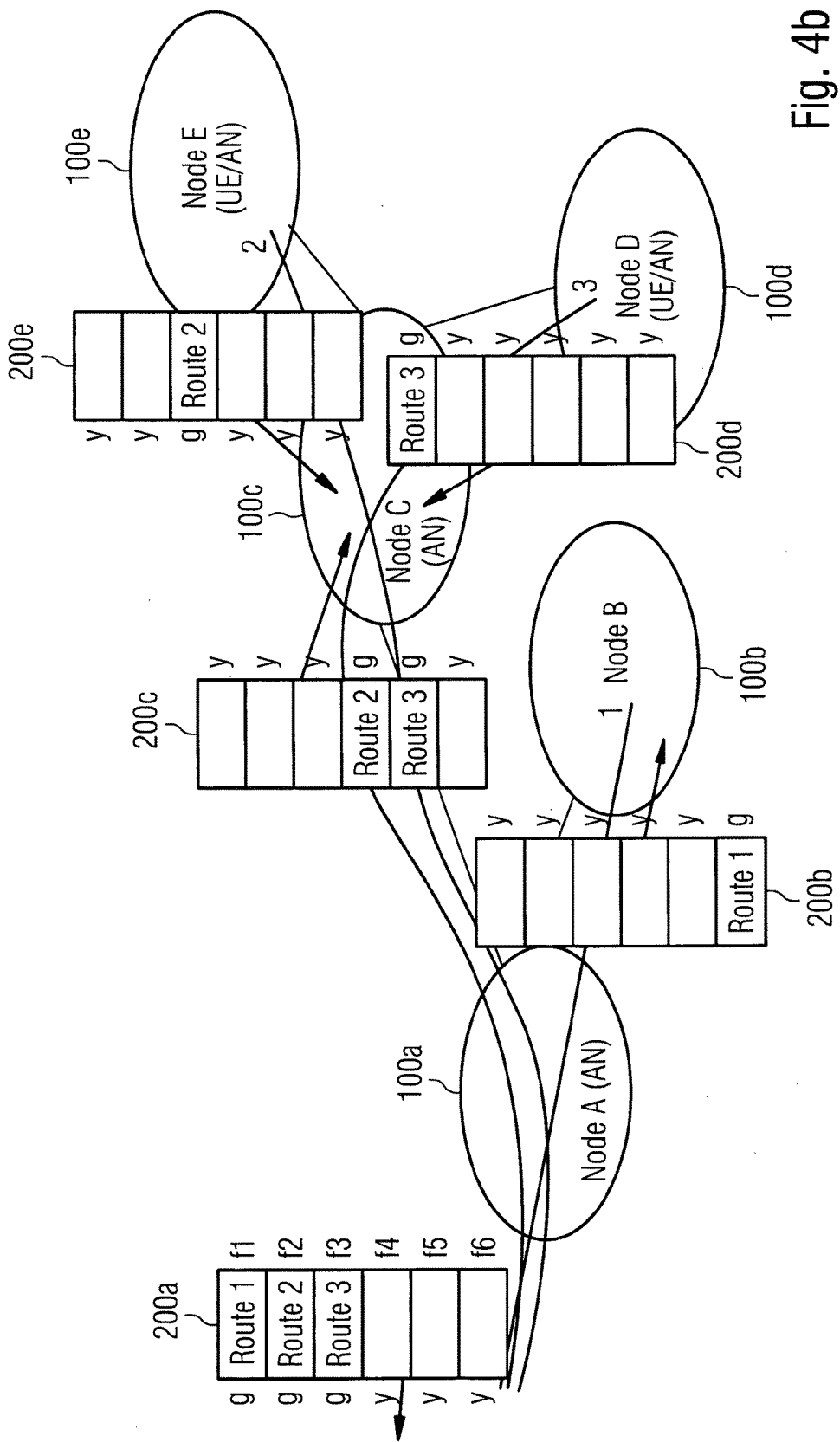

FIGS. 4a and 4b schematically illustrate the use of the Rx and the Tx part of a template frame for a part of a UDN. Each AN 100a to 100e receives as many template frames has it comprises links. That is, AN 100a receives two template frames as it has two links, AN 100b receives one template frame as it has one link, AN 100c receives three template frames as it has three links, AN 100d receives one template frame as it has one link and AN 100e receives one template frame as it has one link. In FIG. 4a, the shown template frames represent the Rx part for ANs 100a, 100d, 100e and the Tx part for ANs 100b and 100c. In other words, for AN 100a, the Rx parts 200a, 200b of two template frames are shown, for AN 100b, the Tx part 200b of one template frame is shown, for AN 100c, the Tx parts 200c, 200d, 200e of three template frames are shown, for AN 100d, the Rx part 200d of one template frame is shown and for AN 100e, the Rx part 200e of one template frame is shown. It is to be noted that, for sake of brevity, only the first sub-frame of the Tx or Rx parts is respectively shown.

As stated above, a template frame includes resource allocations to specific routes passing over a link in both duplex directions. Each route is allocated resources for both up-stream and down-stream communication, which are indicated in the figures by the route number. In FIGS. 4a and 4b, all communication resources which are not marked by route 1, route 2 or route 3 are exemplarily regarded as yellow resources (the small "g" and "y" next to the communication resources indicates whether the resource is a green resource (marked with "g") or a yellow resource (marked with "y")). The yellow resources are not used if all data buffers have data (full buffer traffic) but may be assigned traffic in the case of non-full buffers for some routes.

Figure 5:
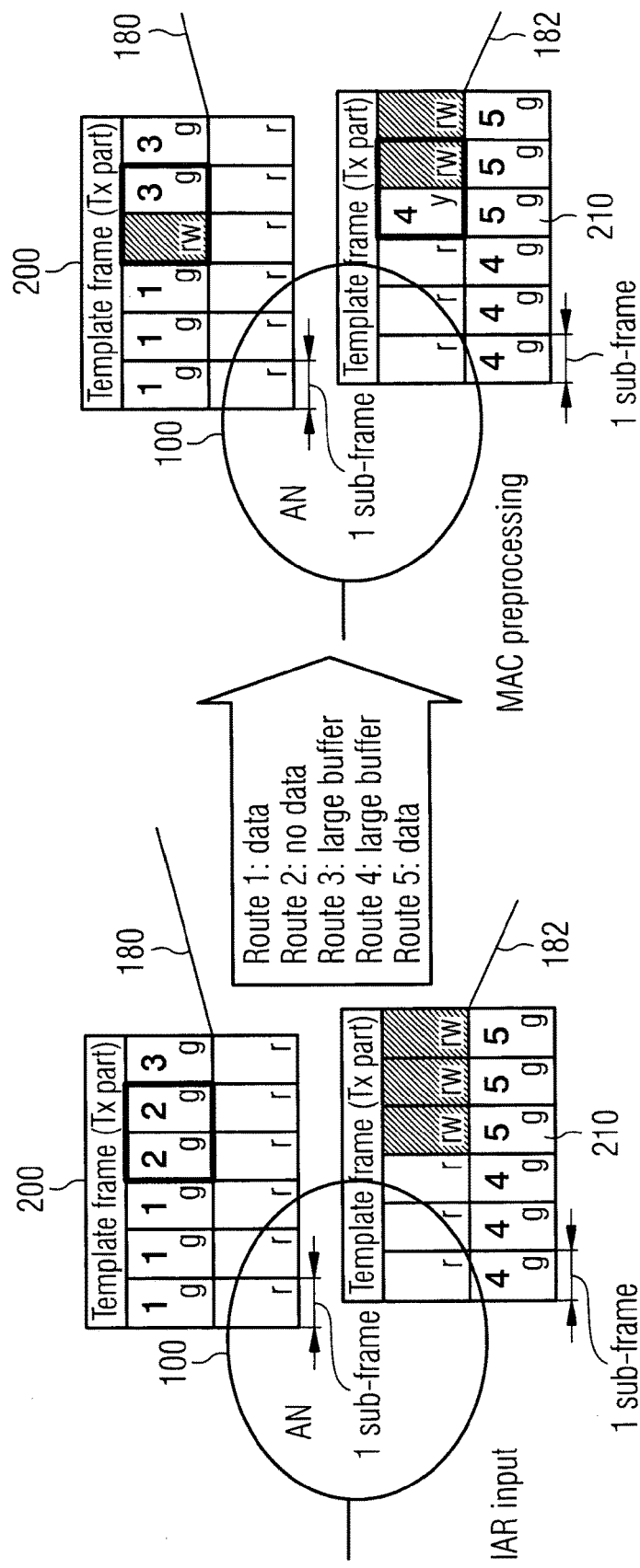
FIG. 5 schematically illustrates adjustment of a template frame by the MAC layer.

In order to thoroughly understand the present disclosure it is now explained, by way of example, with respect to FIG. 5, how one or more shared communication resources can be indicated by adjusted allocation information as adjusted by the adjusting component 160 although the allocation information as received by the receiving component 120 did not contain one or more shared communication resources. FIG. 5 schematically illustrates the situation if one or more data buffers are empty, i.e. do not have data for the one or more corresponding routes.

In the template frame of FIG. 5, only the Tx portion of the template frame 200 is shown. For the upper link 180 of the AN 100, in the Tx portion of the template frame 200, the six sub-frames of the first (upper) sub-band are allocated as green resources for routes 1, 2 and 3. The six sub-frames of the second (lower) sub-band are red resources.

For the lower link 182 of the AN 100, in the Tx portion of the template frame 210, the six sub-frames of the first (upper) sub-band are allocated as red resources and the six sub-frames of the second (lower) sub-band are allocated as green resources for routes 4 and 5. In this way, there is no or at least minimal interference when transmitting data on the upper and lower links 180, 182. If the five data buffers associated with the five routes would have data to be transmitted, the adjusting component in the MAC layer would just follow the received template frames 200, 210 as recommended by the IAR functionality, spectrum sharing functionality or higher layer.

In order to understand the behavior of the MAC layer in case of one or more non-full data buffers, some further explanations are given in the following. The green resources in the template frames 200, 210 are the ones that the IAR functionality, spectrum sharing functionality or higher layer component has assigned to be safe to use, from an inter link interference perspective. These are to be used by the assigned routes if there is data in the data buffer associated with that route. Only green resources in the Tx part of the template frames 200, 210 may be used as shared (yellow) resources in other directions. This has a simple explanation: the AN 100 cannot predict the buffer status of another AN without signaling. However in the Rx part of the template frames (not shown), another AN may decide to turn a red resource of the second type (a non-allocated resource) into a yellow resource and transmit data to the first AN using that resource.

In consequence, only the green resources on a link may be used as yellow resources on a different link from the same AN. The other types may not be used in other links (directions) from the same AN. When a first AN will receive (during the Rx part of the template frame) there may be another second AN that uses a non-allocated communication resource for sending data to the first AN.

Referring to FIG. 5 again, FIG. 5 illustrates, by way of example, two different usages of green resources if the associated route has no data to be transmitted over a link. The AN 100 has an allocation to five different routes over the two considered links 180, 182. By way of example, the data buffer related to route 2 has no data to be transmitted (there is no data for route 2) and the data buffers related to routes 3 and 4 have large buffers, e.g., are full of data. As there is no data related to route 2, the green resources allocated to route 2 are unassigned from route 2 for the upper link 180 by the MAC layer of the AN 100. Instead, one of the communication resources of the template frame 200 is marked as a red resource of the second type (rw resource) and the other of the communication resources of the template frame 200 is allocated to route 3 having a large buffer. For the lower link 182, the adjusting component 140 of the MAC layer allocates a previously red communication resource of the second type (rw resource) in the first row of sub-frames of the template frame 210 as a yellow resource to route 4. This resource was unallocated (as a red resource of the second type) for the upper link 180 by the MAC so that interference remains minimal.

In more detail, in the above-mentioned example, where the template frame 200 as recommended by the IAR functionality, spectrum sharing functionality or higher layer indicates that two green resources are allocated to route 2, the MAC decides to use leftmost of these two green resource for route 4 in another direction (for lower link 182), thereby turning the previously green resource in template frame 200 into a red resource of the second type (rw resource) and the previously red resource of the second type (rw resource) in template frame 210 yellow.

It is further decided by the MAC that the rightmost of the two green resources for route 2 is used by route 3 in template frame 200. This is because it is ok to use green resources assigned to a first route (route 2) for the communication purposes of a second route (route 3) in the same direction, i.e., for the same link 180, since in the next hop the data buffer for the first route (route 2) has not increased in this frame (since there has not been any data received for the first route at the AN). As such the same reuse of resources for the second route (route 3) will appear at a, potentially, later time at the next AN along the route 2 and 3. If the first route (route 2) has empty buffers at the next hop the reuse possibility appears directly and the MAC at the next AN may choose to assign the resource to the route 2 again.

As seen from the above, yellow resources, or shared resources, are generated when a green resource from one link is used for communication on a different link. In this way, although there are not any yellow resources in the template frames 200, 210 as received by the IAR (received allocation information), the MAC layer of the AN 100 has adjusted the template frames 200, 210 (adjusted allocation information) such that the adjusted template frame 210 includes a yellow resource. Such yellow resources are also resources that, from an inter system spectrum sharing perspective, are ok to use but that the IAR has not assigned a route to. This may be the case near leaf ANs in a UDN, where each link only carries one or a few routes but can support a lot more data.

The reservation of such yellow resources for usage by one or more links will now be explained with respect to FIGS. 6 and 7. In other words, possible realizations of step S206 of FIG. 2 are described in more detail. More precisely, a method for accessing shared (yellow) communication resources, e.g., atomic scheduling units (ASUs—i.e., the smallest unit of a communication resource), without interfering with other concurrent transmissions in a UDN will be described.

According to the exemplary scheme described below, a flooding technique is used for transmitting the reservation information according to step S206. A flooding algorithm is an algorithm for distributing data, e.g., data packets, to every part of a graph of a network. The name derives from the concept of inundation by a flood.

The overall idea with flooding of reservation information is that the AN that wants to access the shared (yellow) communication resource, e.g., yellow ASU, lets the rest of the ANs in the UDN know that a shared communication resource will be used. For example, the AN 100 may inform the rest of the ANs in the UDN which resource will be used, where and when. The message that is sent, to the other nodes in the UDN will be called, by way of example, receiver channel reservation (RCR) message herein and contains at least one of the following information:

(i) information indicating the at least one shared communication resource that is reserved for usage by the at least one of the plurality of ANs (in short: which shared resource is reserved);
(ii) information indicating the starting time of the at least one shared communication resource that is reserved for usage by the at least one of the plurality of ANs (in short: starting frame/time of the resource reservation);
(iii) information indicating the duration of the at least one shared communication resource that is reserved for usage by the at least one of the plurality of ANs (in short: duration of the reservation) or information indicating the end time of the at least one shared communication resource that is reserved for usage by the at least one of the plurality of ANs (in short: end time of the reservation);
(iv) information indicating the priority of the reservation of the at least one shared communication resource (in short: priority information, e.g., indicating if the reservation is more or less important than some competing reservation, used for the case of colliding reservations as explained below);
(v) information indicating at least one of the plurality of ANs which is intended to be the receiver of transmissions using the at least one shared communication resource (in short: indication of which node will be the receiver of the transmissions using the reserved resource);
(vi) information indicating at least one of the plurality of ANs which is intended to be the transmitter of transmissions using the at least one shared communication resource (in short: indication of which node will be the transmitter of the transmissions using the reserved resource).

The RCR message is sent using a flooding technique through the UDN which ensures that all other ANs are aware of the communication resource reservation, e.g., the ASU reservation. The flooding uses the already established links in the UDN and the messages may be piggy-backed on the data packets that are sent along the links. The flooding messages (RCR messages) are typically lightweight and from this perspective the links have virtually extraordinary capacity.

Even if in the below flooding will be described with respect to a UDN having a tree structure, the flooding also works if the UDN does not have a tree structure but another structure, e.g., if there are connection loops. This is because each concerned AN is connected to the UDN and as such will be reached by the flooded message via perhaps a multitude of paths. Infinite loops of flooded messages are avoided since when an AN receives a message that it has already received, it simply does not forward it.

Figure 6:
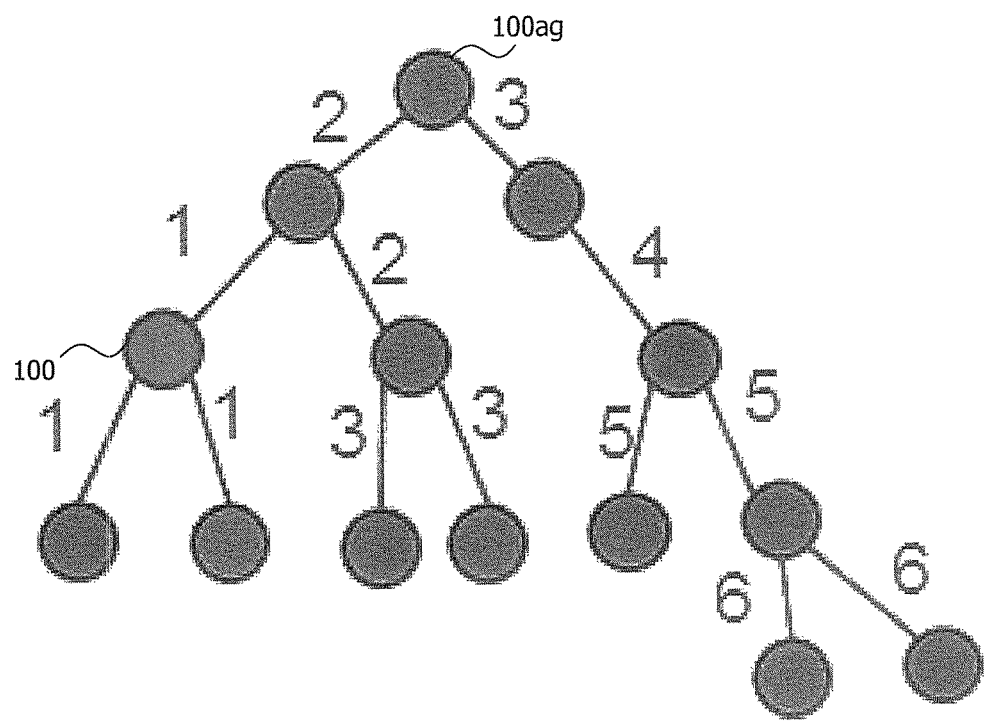
FIG. 6 schematically illustrates collision-free flooding of an RCR message in a tree-structured UDN.

In FIG. 6, the AN 100 in the illustration is the source initiating the flooding, which is called source AN 100 in the following. Further, there is an aggregation node (AgN) 100ag.

At first, the source AN 100 transmits an RCR message comprising a resource reservation by flooding to all other ANs in the UDN. In FIG. 6, the numbers at the links do not relate to routes but to the time that has passed (the number of frames) until the RCR message (after transmission by the source AN 100) is transmitted over the respective link when using the flooding technique. As none of the other ANs sent out an RCR message in FIG. 6, FIG. 6 shows a collision free realization of the flooding of an RCR message through a UDN. After six frames all ANs have been reached by the RCR message and the resource is safe to be used by the source AN 100 for the reservation duration. After having received the RCR message sent out by the AN 100, other ANs than the AN 100 may refrain from transmitting in resources that they know would interfere with the claimed resource (as claimed in the RCR message). If it is not interfering, the resource may be spatially reused by other links.

This interference estimation is possible since all ANs are assumed to have the complete gain matrix (G-matrix) available. For example, the gain matrix has been estimated for the IAR operation. As such each AN may estimate if transmissions along the various links from the AN will interfere with the reception by the AN indicated in the RCR message. This may be done by comparing the estimated interference to a threshold that may be adjusted to account for e.g., the fading conditions or the number of ANs in the UDN (to take some height for aggregate interference due to spatial reuse). If the estimated interference is below the threshold, the resource stays yellow and may be used by the link. If the estimated interference is above the threshold, the resource is not usable. If so for some links due to a resource reservation it is marked red in the corresponding template frames for the duration of the reservation and hence the MAC will not use it for communication.

The starting time of using the reservation as indicated in the RCR message may not be before the time for flooding in the UDN, i.e., the number of frames until the RCR has been received by all nodes in the UDN, has passed. The starting time of using the reservation may be at least the present time plus the time needed for flooding (in short, time for flooding). The starting time of using the reservation may be regarded as the earliest time that the allocation can be ensured to have been announced to everyone. This delay (compared to starting to use the ASU immediately at the present time) is included to avoid collisions in the resource. The time for flooding is given as the time it takes to reach every other AN in the UDN from a given AN. In the specific exemplary case of a tree-structured UDN illustrated in FIG. 6, the flooding time from node 100 is 6.

The structure of the UDN is not restricted to a tree structure as exemplarily shown in FIG. 6. For example, the flooding time for any other mesh topology can be estimated by taking into account the number of hops to reach the node furthest away with the least number of hops. This can be found by flooding messages and counting the number of hops each message has jumped, the number of hops is stored in each message. Each node stores the number in each flooded such message that it passes on and in the end returns the lowest such number to the origin of the flooding node (source node). The maximal of these reported numbers is the flooding time of the network.

Figure 7:
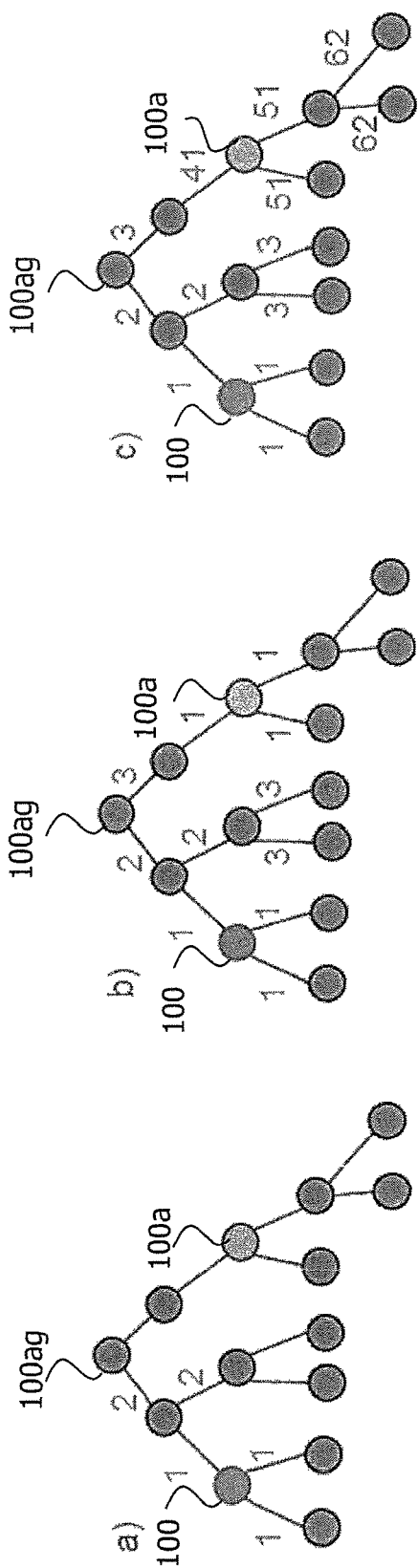
FIG. 7 schematically illustrates flooding with a collision of RCR messages in the tree-structured UDN of FIG. 6.

An illustration of the flooding procedure when two ANs try to reserve the same resource roughly at the same time is given in FIG. 7. Thus, in FIG. 7, a reservation collision resolution is schematically depicted. Such a situation may occur when two or more ANs such as AN 100 and AN 100a want to reserve the same resource within the flooding time of the first flooded message (either the RCR message transmitted from AN 100 or the RCR message transmitted from AN 100a). Before describing the sequence of events in FIG. 7, a definition of what is to be understood as a compatible reservation is given.

Two resource reservations of the same communication resource, e.g., ASU, for different links are said to be compatible if the transmissions, if they were to occur, would not significantly interfere the non-intended receiver. This assessment may be done at any AN by using the complete gain matrix (G-matrix) which may be available due to the IAR operation. The ANs may thus compute if the allocations would—if they were to be used at the same time by the two links—cause significant interference to the receiver of the other link. If none of the receivers are estimated to be interfered (above a threshold) the reservations are said to be compatible. The calculation is done in the same manner as when a resource is assessed for being turned to red or not, as described above. More precisely, an estimation of the path gain between the concerned nodes is considered (i.e., the intended transmitter node (in the second RCR message) and the receiver node in the previous reservation (first RCR message)). With this estimation it is determined whether the transmission indicated in the second RCR message interferes with the reception of the transmission indicated in the first RCR message. If in the affirmative, then the reservations are not compatible. If "no" the reservation are compatible.

Returning to FIG. 7, the AN 100 sends an RCR message. Likewise, the AN 100a sends an RCR message. It is exemplarily assumed that both RCR messages have same priority and start timing. AN 100a receives the RCR message of the AN 100 and vice versa. If the two reservations are compatible, everything is fine. The reservations can be used by the AN 100 and the AN 100a, respectively. If they are not compatible, one (and only one) AN, either the AN 100 or the AN 100a, has to give up. If both ANs 100, 100a would give up, the resource would be wasted since nobody uses it.

The decision which AN is to give up may be based on a receiving node identity (AN 100 knows its own destination and the destination of AN 100a from the RCR message and vice versa). In one embodiment, a lower destination node identity is given the priority, i.e., "wins". A node identity number may be assigned so that ANs closer to the AgN 100ag (i.e., closer to the wired backhaul) have lower numbers (higher priority) than ANs that are more hops away from the AgN 100ag. This scheme prioritizes traffic that is sent close to the AgN 100ag. This is beneficial since capacity bottlenecks are more likely to appear close to the AgN 100ag than further away (measured in number of hops) from it. The decision could also be made at an intermediate AN, which is just forwarding RCR message(s). The RCR message of the losing AN is not forwarded.

Referring to FIG. 7 again, the illustrated sequence of events is as follows:

At first, at time 0, AN 100 starts flooding (sending out an RCE message by flooding) for a reservation starting at time t=7, i.e., the frame directly after the time for flooding in the UDN (see part a) of FIG. 7) has passed. As explained above with respect to FIG. 6, the time for flooding for AN 100 is 6 in the present example. As the communication resource is not allowed to be used until the flooding is finished, the reservation for usage is to be started at time t=1+6=7 at the earliest.

At time 2, the AN 100a plans to reserve the same communication resource starting at t=3+5=8 (see part b) of FIG. 7). As explained above with respect to FIG. 6, the time for flooding for AN 100a is 5 in the present example, and the flooding is initialized at time 2. In order to determine the time for flooding, the number of hops from the AN 100a to an AN in the UDN can be counted, which is the furthest to the AN 100a (i.e., count the number of hops from the AN 100a to an AN which is the most hops away from AN 100a). Hence communication (use of the reserved resource) may start the frame after that. When two messages for overlapping allocations are received at an AN, the AN evaluates whether or not the reservations are compatible. If the reservations are compatible, both flooding messages are forwarded. If the reservations are not compatible, only the message with the lowest start time is forwarded.

According to a first variant, when the AN 100a receives the RCR message of AN 100, the AN 100a, for example, deems the reservations not to be compatible. In FIG. 7 it is assumed by way of example that, if the RCR messages are not compatible, the RCR message of AN 100a will not be forwarded through the UDN as it has been started at a later point of time. Thus, AN 100a backs off. AN 100a may possibly start flooding an RCR message for resource reservation starting at t=6+<reservation duration of AN 100>. In other words, the AN 100a has to wait until the reservation of AN 100 is over plus the time offset 6 (because the time duration of the flooding is 5). This new message will be flooded immediately since the reservation is compatible (does not collide time-wise) with the reservation of AN 100.

According to a second variant (not shown in FIG. 7), if the reservations are not compatible, a priority decision may be made. For example, AN 100a has higher priority than as indicated by the RCR message of AN 100. For example, the RCR message of AN 100a may contain priority information which is higher than the priority information contained in the RCR message of AN 100. This higher priority information causes the flooding messages of AN 100 to stop being flooded and the AN 100 to back off.

According to a third variant (not shown in FIG. 7), root-near ANs (i.e., ANs at a low hop count distance from the AgN 100ag) will have an advantage over deeper nodes. This may be beneficial as root-near ANs typically carry more traffic.

The invention claimed is:

1. A method of reserving shared communication resources in a wireless communication network, the wireless communication network comprising a plurality of access nodes, each of the plurality of access nodes being connected to one or more of the plurality of access nodes via one or more access node-to-access node links, the method comprising:

receiving, by an access node of the plurality of access nodes, allocation information indicating one or more shared communication resources of available communication resources, the one or more shared communication resources to be shared by an access node-to-access node link of the access node with one or more other access node-to-access node links of the wireless communication network;

transmitting, by the access node, first reservation information to one or more other access nodes of the plurality of access nodes, the first reservation information comprising information indicating that at least one shared communication resource of the one or more shared communication resources is reserved, for at least one access node-to-access node link of at least one of the plurality of access nodes, for usage by the at least one of the plurality of access nodes;

receiving, by the access node and from another access node of the plurality of access nodes, second reservation information comprising information indicating that at least one shared communication resource of the one or more shared communication resources is reserved for at least one other link of at least one of the plurality of access nodes; and determining, by the access node, whether the usage of the at least one shared communication resource as indicated by the second reservation information is compatible with the usage of the at least one shared communication resource as indicated by the first reservation information.

2. The method of claim 1, wherein the first reservation information further comprises at least one of:

information indicating the at least one shared communication resource that is reserved for usage by the at least one of the plurality of access nodes;
information indicating a starting time of the at least one shared communication resource that is reserved for usage by the at least one of the plurality of access nodes;
information indicating an end time of the at least one shared communication resource that is reserved for usage by the at least one of the plurality of access nodes;
information indicating a duration of the at least one shared communication resource that is reserved for usage by the at least one of the plurality of access nodes;
information indicating a priority of the reservation of the at least one shared communication resource that is reserved for usage by the at least one of the plurality of access nodes;
information indicating at least one of the plurality of access nodes which is intended to be the receiver of transmissions using the at least one shared communication resource that is reserved for usage by the at least one of the plurality of access nodes; and
information indicating at least one of the plurality of access nodes which is intended to be the transmitter of transmissions using the at least one shared communication resource that is reserved for usage by the at least one of the plurality of access nodes.

3. The method of claim 1, further comprising using, by the at least one of the plurality of access nodes, the at least one shared communication resource as indicated by the first reservation information at a time period after the transmission of the first reservation information.

4. The method of claim 3, further comprising determining the time period by considering the number of links from the access node to another access node which is furthest away from the access node.

5. The method of claim 1, wherein the determining whether the usage of the at least one shared communication resource as indicated by the second reservation information is compatible with the usage of the at least one shared communication resource as indicated by the first reservation information comprises determining whether the usage of the at least one shared communication resource as indicated by the second reservation information interferes with the usage of the at least one shared communication resource as indicated by the first reservation information.

6. The method of claim 1, further comprising the access node, in response to determining that the usage of the at least one shared communication resource as indicated by the second reservation information is compatible with the usage of the at least one shared communication resource as indicated by the first reservation information, forwarding the second reservation information to at least one other of the plurality of access nodes.

7. The method of claim 1, further comprising the access node, in response to determining that the usage of the at least one shared communication resource as indicated by the second reservation information is not compatible with the usage of the at least one shared communication resource as indicated by the first reservation information, not forwarding the second reservation information to at least one other of the plurality of access nodes.

8. The method of claim 1, further comprising the access node forwarding the second reservation information to at least one of the plurality of access nodes in response to both of the following being true:
determining that the usage of the at least one shared communication resource as indicated by the second reservation information is not compatible with the at least one shared communication resource as indicated by the first reservation information; and
determining that the information contained in the first and second reservation information indicates that the priority of the reservation of the at least one shared communication resource as indicated by the second reservation information is higher than the priority of the reservation of the at least one shared communication resource as indicated by the first reservation information.

9. The method of claim 1, further comprising the access node forwarding the second reservation information to at least one other of the plurality of access nodes in response to both of the following being true:
determining that the usage of the at least one shared communication resources as indicated by the second reservation information is not compatible with the usage of the at least one shared communication resource as indicated by the first reservation information; and
determining that the second reservation information has been sent out earlier, by another access node, than the first reservation information has been sent out by the access node.

10. The method of claim 1, wherein the receiving the allocation information comprises receiving at least one template frame, the at least one template frame indicating how the available communication resources are to be allocated.

11. The method of claim 1, wherein the transmitting the first reservation information comprises transmitting the first reservation information by flooding to at least a subset of the plurality of access nodes.

12. The method of claim 1, wherein the wireless communication network comprises or is configured as an Ultra Dense Network.

13. A computer program product stored in a non-transitory computer readable medium for reserving shared communication resources in a wireless communication network, the wireless communication network comprising a plurality of access nodes, each of the plurality of access nodes being connected to one or more of the plurality of access nodes via one or more access node-to-access node links, the computer program product comprising software instructions which, when run on an access node of the plurality of access nodes, causes the access node to:
receive allocation information indicating one or more shared communication resources of available communication resources, the one or more shared communication resources to be shared by an access node-to-access node link of the access node with one or more other access node-to-access node links of the wireless communication network;
transmit first reservation information to one or more other access nodes of the plurality of access nodes, the first reservation information comprising information indicating that at least one shared communication resource of the one or more shared communication resources is reserved, for at least one access node-to-access node link of at least one of the plurality of access nodes, for usage by the at least one of the plurality of access nodes;
receive, from another access node of the plurality of access nodes, second reservation information comprising information indicating that at least one shared communication resource of the one or more shared communication resources is reserved for at least one other link of at least one of the plurality of access nodes; and determine whether the usage of the at least one shared communication resource as indicated by the second reservation information is compatible with the usage of the at least one shared communication resource as indicated by the first reservation information.

14. An access node for reserving shared communication resources in a wireless communication network, the wireless communication network comprising a plurality of access nodes, each of the plurality of access nodes being connected to one or more of the plurality of access nodes via one or more access node-to-access node links, the access node comprising:

a processor;

memory containing instructions executable by the processor whereby the access node is operative to:

receive allocation information indicating one or more shared communication resources of available communication resources, the one or more shared communication resources are to be shared by an access node-to-access node link of the access node with one or more other access node-to-access node links of the wireless communication network; and transmit first reservation information to one or more other access nodes of the plurality of access nodes, the first reservation information comprising information indicating that at least one shared communication resource of the one or more shared communication resources is reserved, for at least one access node-to-access node link of at least one of the plurality of access nodes, for usage by the at least one of the plurality of access nodes;

receive, from another access node of the plurality of access nodes, second reservation information comprising information indicating that at least one shared communication resource of the one or more shared communication resources is reserved for at least one other link of at least one of the plurality of access nodes; and determine whether the usage of the at least one shared communication resource as indicated by the second reservation information is compatible with the usage of the at least one shared communication resource as indicated by the first reservation information.

15. A wireless communication network operative to reserve shared communication resources in the wireless communication network, the wireless communication network comprising:

a plurality of access nodes, each of the plurality of access nodes being connected to one or more of the plurality of access nodes via one or more access node-to-access node links;

wherein the plurality of access nodes comprises a first access node, the first access node comprising:

a processor;

memory containing instructions executable by the processor whereby the first access node is operative to:

receive allocation information indicating one or more shared communication resources of available communication resources, the one or more shared communication resources are to be shared by an access node-to-access node link of the first access node with one or more other access node-to-access node links of the wireless communication network; and transmit first reservation information to one or more other access nodes of the plurality of access nodes, the first reservation information comprising information indicating that at least one shared communication resource of the one or more shared communication resources is reserved, for at least one access node-to-access node link of at least one of the plurality of access nodes, for usage by the at least one of the plurality of access nodes;

receive, from another access node of the plurality of access nodes, second reservation information comprising information indicating that at least one shared communication resource of the one or more shared communication resources is reserved for at least one other link of at least one of the plurality of access nodes; and determine whether the usage of the at least one shared communication resource as indicated by the second reservation information is compatible with the usage of the at least one shared communication resource as indicated by the first reservation information.

* * * * *